United States Patent [19]

Sardisco

[11] 4,137,063
[45] Jan. 30, 1979

[54] PRODUCTION OF POTASSIUM POLYPHOSPHATES FROM POTASSIUM SILICOFLUORIDES

[75] Inventor: John B. Sardisco, Shreveport, La.

[73] Assignee: Pennzoil Company, Shreveport, La.

[21] Appl. No.: 810,002

[22] Filed: Jun. 24, 1977

[51] Int. Cl.$^2$ ............... C05B 21/00; C05B 11/04
[52] U.S. Cl. ............... 71/51; 23/302 R; 71/37; 71/52; 71/53; 423/309; 423/313; 423/315
[58] Field of Search ............ 423/305, 314, 315, 320, 423/313, 309; 252/135, 175, 181; 23/302 R; 71/43, 37, 34, 36, 40, 41, 51, 53, 52, 45, 47, DIG. 3, 46

[56] References Cited

U.S. PATENT DOCUMENTS

| | | | |
|---|---|---|---|
| 1,950,068 | 3/1934 | Spangenberg | 71/52 X |
| 2,853,363 | 9/1958 | Sidun et al. | 23/302 X |
| 2,874,027 | 2/1959 | Gloss | 423/314 |
| 2,942,967 | 6/1960 | Caldwell | 71/43 X |
| 3,049,419 | 8/1962 | Raistrick et al. | 423/314 X |
| 3,110,562 | 11/1963 | Hinkle | 71/DIG. 3 |
| 3,151,941 | 10/1964 | Hollingsworth et al. | 71/DIG. 3 |
| 3,264,085 | 8/1966 | Hignett et al. | 71/41 X |
| 3,361,523 | 1/1968 | Shen | 423/315 X |
| 3,689,216 | 9/1972 | Brown | 423/320 X |
| 3,803,884 | 4/1974 | Thompson | 71/37 X |
| 4,028,237 | 6/1977 | Nishimura et al. | 423/305 X |

OTHER PUBLICATIONS

Sauchelli; Chemistry & Technology of Fertilizers; Reinhold Pub. Corp. N.Y., N.Y.; 1960; pp. 129, 145, 146, 134, 135, 150, 151.
Slaska; Chem. Abstr. 68:61084f (1968).

Primary Examiner—Kenneth M. Schor
Attorney, Agent, or Firm—Lowe, King, Price & Becker

[57] ABSTRACT

Potassium polyphosphate polymers having ratios of $P_2O_5$ to $K_2O$ which make them suitable as fertilizer products are prepared by reacting potassium fluosilicate also known as potassium silicofluoride with phosphoric acid and sulfuric acid at temperatures of about 250–500° C.

11 Claims, 5 Drawing Figures

PRODUCTION OF POTASSIUM POLYPHOSPHATES FROM POTASSIUM SILICOFLUORIDES

BACKGROUND OF THE INVENTION

1. Field of the Invention

This invention relates to an improved process for the manufacture of potassium polyphosphates from potassium raw materials, and more particularly to a method for the production of potassium polyphosphates from potassium fluosilicates and mineral acids and the resulting novel products.

2. Description of the Prior Art

A fertilizer may be defined as a compound or mixture of compounds which contain nitrogen and/or phosphorus and/or potassium in such forms that they are available for assimilation by plants. The plant food content of the fertilizer is often expressed as the total of the percentages of nitrogen (N), phosphate ($P_2O_5$), and potassium ($K_2O$). Many different types of fertilizers have been prepared and are used commercially including various ammonium phosphates, potassium phosphates and the like.

One class of materials which has been found useful as fertilizers when produced from potassium, and as useful in the detergent art when prepared from sodium, are the so-called crystalline condensed phosphates. Materials of this type have been prepared heretofore by heating of various raw materials at high temperatures or calcined. For example, in the preparation of tetrasodium pyrophosphates, anhydrous disodium orthophosphate may be calcined at any temperatures between 300–900° C. Condensed potassium phosphates have been produced as described for example in U.S. Pat. No. 3,600,152.

None of these prior art procedures however, has been concerned with a product having fertilizer characteristics which can be prepared from a material which has heretofore been considered as a by-product. Thus, in the formation of wet process phosphoric acid by the acidulation of phosphate rock with sulfuric acid, there is often produced a by-product from the reaction of the fluorine and silicon contained in the phosphate rock with any alkali metal present, the product formed being alkali metal fluosilicate. This material may be subsequently recovered from either precipitated gypsum solids or precipitated from the wet process phosphoric acid.

The alkali metal fluosilicate has the formula $M_2SiF_6$, where M is alkali metal, usually potassium or sodium. As pointed out above, this material has previously been treated as a by-product as there was no commercially available procedure for its conversion to a useful product. With the limitations now being placed on phosphoric acid plants to prevent evolution of the fluorides during the acidulation, it is to be expected that more and more alkali metal silicofluorides will be produced and will either have to be converted to a useful form or disposed of in other ways. This would, of course, be an uneconomic aspect of any phosphoric acid plant.

It is known from U.S. Pat. No. 3,689,216 to Brown that potassium fluosilicate may be converted to gaseous hydrogen fluoride by reacting the fluosilicate with excess sulfuric acid at temperatures of 20–100° C. so as to produce gaseous silicon tetrafluoride and a fluoride-containing by-product and heating the by-product to a temperature of 80–300° C. to produce the hydrogen fluoride product. It is also known from U.S. Pat. No. 2,874,027 to convert mixtures of alkali metal fluorides in phosphoric acid into glassy alkali metal polymetaphosphate by reaction at high temperatures. A similar product is prepared in U.S. Pat. No. 3,049,419 as well as U.S. Pat. No. 3,361,523.

In none of these prior art patents or of any other prior art which Applicant is aware, are there disclosures by which alkali metal fluosilicate can be converted to useful forms which have valuable fertilizer characteristics.

SUMMARY OF THE INVENTION

It is accordingly one object of the present invention to provide a method for the production of condensed alkali metal polyphosphate polymers which overcome or otherwise mitigate these problems of the prior art.

A still further object of the present invention is to provide a method for the production of an alkali metal polyphosphate polymer which is useful in having fertilizer characteristics, the polymer being produced from an alkali metal fluosilicate.

A still further object of the present invention is to provide a method for the production of a polymeric fertilizer grade material by the high temperature reaction of potassium fluosilicate with certain mixtures of mineral acids, as well as the polymeric material as a novel product.

Other objects and advantages of the present invention will become apparent as the description thereof proceeds.

In satisfaction of the foregoing objects and advantages there is provided by this invention in a first embodiment, a method for the production of an alkali metal polyphosphate polymeric material which comprises reacting an alkali metal fluosilicate with a mixture of phosphoric acid and sulfuric acid at temperatures in the range of about 250–500° C. Also provided are novel alkali metal polyphosphate polymeric products, and a fertilizer containing as the active ingredient, the polymeric polyphosphate polymer produced by the reaction of potassium fluosilicate with a mixture of phosphoric acid and sulfuric acid at high temperatures.

BRIEF DESCRIPTION OF THE DRAWINGS

Reference is now made to the drawings accompanying this application where it will be seen that.

DESCRIPTION OF PREFERRED EMBODIMENTS

Figure 1:
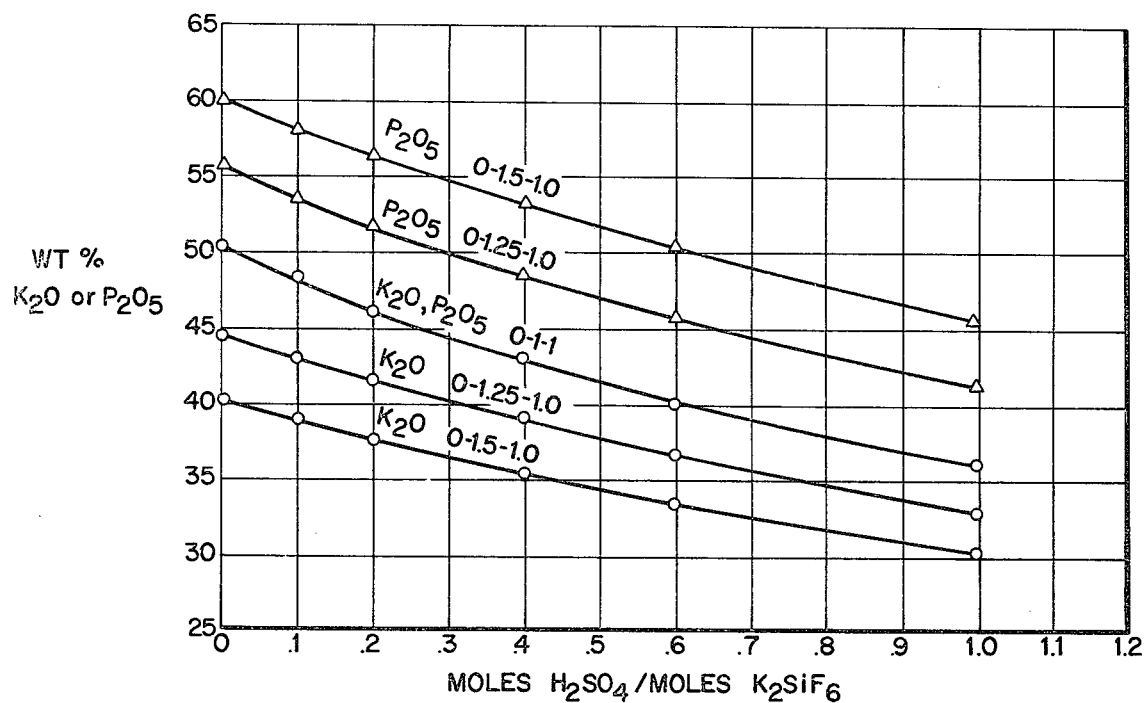
FIG. 1 is a plot or graph of the weight percent $K_2O$ or $P_2O_5$ versus the moles of sulfuric acid used per mole of $K_2SiF_6$ at different weight ratios for pure systems.

As indicated above, the present invention is concerned with a method for the production of novel alkali metal polyphosphates from alkali metal fluosilicates. According to the present invention, alkali metal fluosilicates are reacted or calcined at elevated temperatures with certain mixtures of mineral acids to produce condensed alkali metal polyphosphates. When potassium fluosilicates are the starting materials, the resulting products have $P_2O_5$ and $K_2O$ ratios which make the product eminently suitable as fertilizer grade material.

The present invention is generally described hereinafter with respect to the production of potassium polyphosphates by decomposition and reaction of potassium fluosilicates at high temperatures. Because of their potassium and phosphate concentrations, as well as the presence of minor quantities of certain micronutrients which are also useful for addition to this soil, these polymers are useful in the fertilizer area. It should be understood however, that it is within the scope of the present invention to also utilize other alkali metal fluosilicates and particularly sodium fluosilicates for decomposition at high temperatures to produce condensed sodium polyphosphates which are useful in the detergent area. Thus, the sodium polyphosphates also represent materials not produced in this manner heretofore.

According to the present invention, it has been found that potassium fluosilicate, which has not been known heretofore as a material of substantial utility, can be decomposed at elevated temperatures by certain mixtures of mineral acids to produce a gas phase containing silicon tetrafluoride and hydrofluoric acid and the potassium salt of a mineral acid. In conducting these reactions however, it was found that complete decomposition with phosphoric acid occurred only with a considerable excess of phosphoric acid. Moreover, the resulting solid was not suitable as a fertilizer product because the ratio of $P_2O_5$ to $K_2O$ was too high. It was accordingly found that the addition of a small amount of sulfuric acid to the phosphoric acid provided a mineral acid mixture which completely decomposed the potassium fluosilicates at temperatures above about 250° C. and formed compounds with weight ratios of $P_2O_5$ to $K_2O$ as low as 1. The amount of sulfuric acid necessary for the reaction depends upon the decomposition temperature and desired ratio of $P_2O_5$ to $K_2O$. Therefore, the present invention may be broadly described as a process wherein potassium fluosilicate ($K_2SiF_6$) can be decomposed at temperatures from 250°-500° C. by phosphoric acid containing a certain amount of sulfuric acid in accordance with the following equation:

$$K_2SiF_6 + nH_3PO_4 + XH_2SO_4 \rightarrow SiF_4 \uparrow + 2HF \uparrow + XK_2SO_4 + (2-2X)KPO_3 + (n+2X-2)(HPO_3) + (n)HOH$$

In the above equation the amounts of phosphoric acid and sulfuric acid are calculated as based generally on the use of commercial concentrations of these materials. Thus, the phosphoric acid used in these experiments was wet process phosphoric acid having a concentration in the range of about 25-38 weight percent and the sulfuric acid was commercially obtained sulfuric acid having a concentration of about 96 weight percent. Since the calculations or presentations for the equation are made in moles, the appropriate consideration should be made for use of the different concentrations of phosphoric acid and sulfuric acid in determining the amounts of materials to be utilized in this reaction.

In the above equation, it will be seen that substantially one mole of potassium fluosilicate is reacted with amounts of phosphoric acid indicated by the letter n, and amounts of sulfuric acid indicated by the letter X. The amount of phosphoric acid which should be used is definite and may be calculated from the following ratio:

$$n = 2(P_2O_5) \text{ moles}/(K_2O) \text{ moles}$$

The amount of phosphoric acid to be maintained in the system should be in an amount so as to provide $P_2O_5{:}K_2O$ ratios in the range of 4:1 to 1:1, respectively. Thus, the value of n or the moles of phosphoric acid to be used, is limited by the 4:1 to 1:1 molar ratio.

It will therefore be seen that the amount of phosphoric acid used represents two times the moles of $P_2O_5$ over the moles of $K_2O$ desired in the final polyphosphate fertilizer product. Further, the amount of sulfuric acid used is always less than 1 mole and generally ranges from 0.05 to 0.95 moles of sulfuric acid per mole of $K_2SiF_6$.

As may be noted from the equation, the reaction is conducted at a temperature of 250°-500° C. any may be conducted in any apparatus such as a kiln or the like under which such high temperature conditions can be maintained with provision made for the elimination of the gases during the high temperature reaction taking place. The reaction is conducted over an extended period of time with longer reaction periods resulting in more complete conversion. However, in general, the reaction time should range from about ½ to 24 hours and preferably about 1-6 hours.

The products resulting from the reaction are gaseous products and solid products. The gaseous products are silicon tetrafluoride and hydrofluoric acid and may be removed and recovered by any desired means such as by trapping in a water or sodium hydroxide trap or the like, as well known in the art.

In a further embodiment, the $SiF_4$ and HF gases can be trapped or reacted with a solution and/or suspension of calcium hydroxide to precipitate solid $CaF_2$ and $SiO_2$ at 30° to 80° C. Calcium fluoride (fluospar) is of course a known and useful article of commerce. Alternatively, the $SiF_4$ and HF can be recovered by trapping at 30°-60° C. in 1-10 wt. % aqueous solutions of potassium salts, preferably aqueous solutions of KOH, $KH_2PO_4$, $KHSO_4$, $K_2SO_4$ and/or KCl. In this alternative, reaction with the potassium salt will form insoluble $K_2SiF_6$, the starting material in the process which can be recycled to the original high temperature reaction. This latter alternative of course permits overall increased conversions and improved economics for the process.

Figure 4:
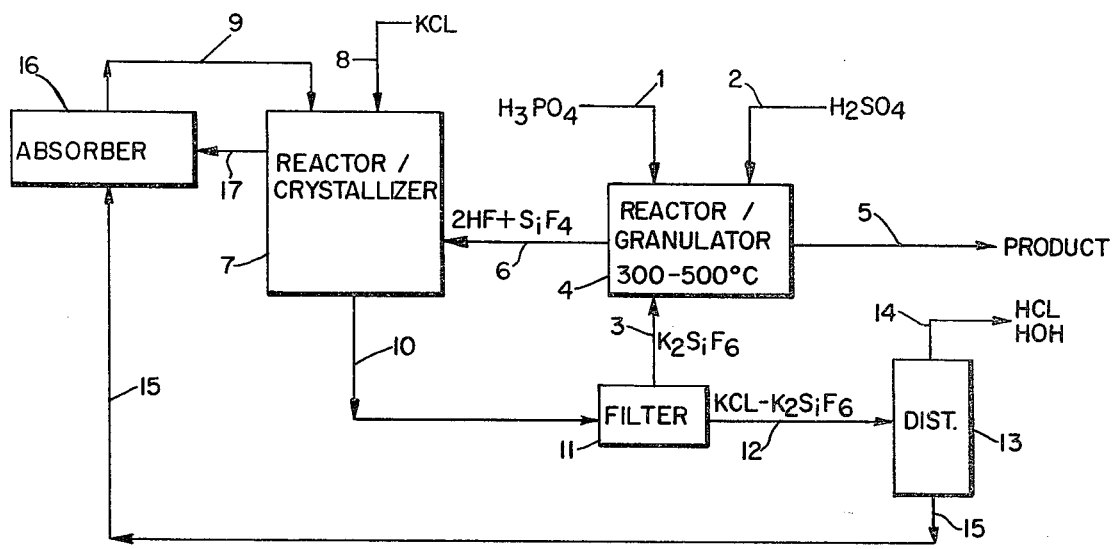
FIG. 4 is a flow sheet showing one embodiment of a continuous process.
Figure 5:
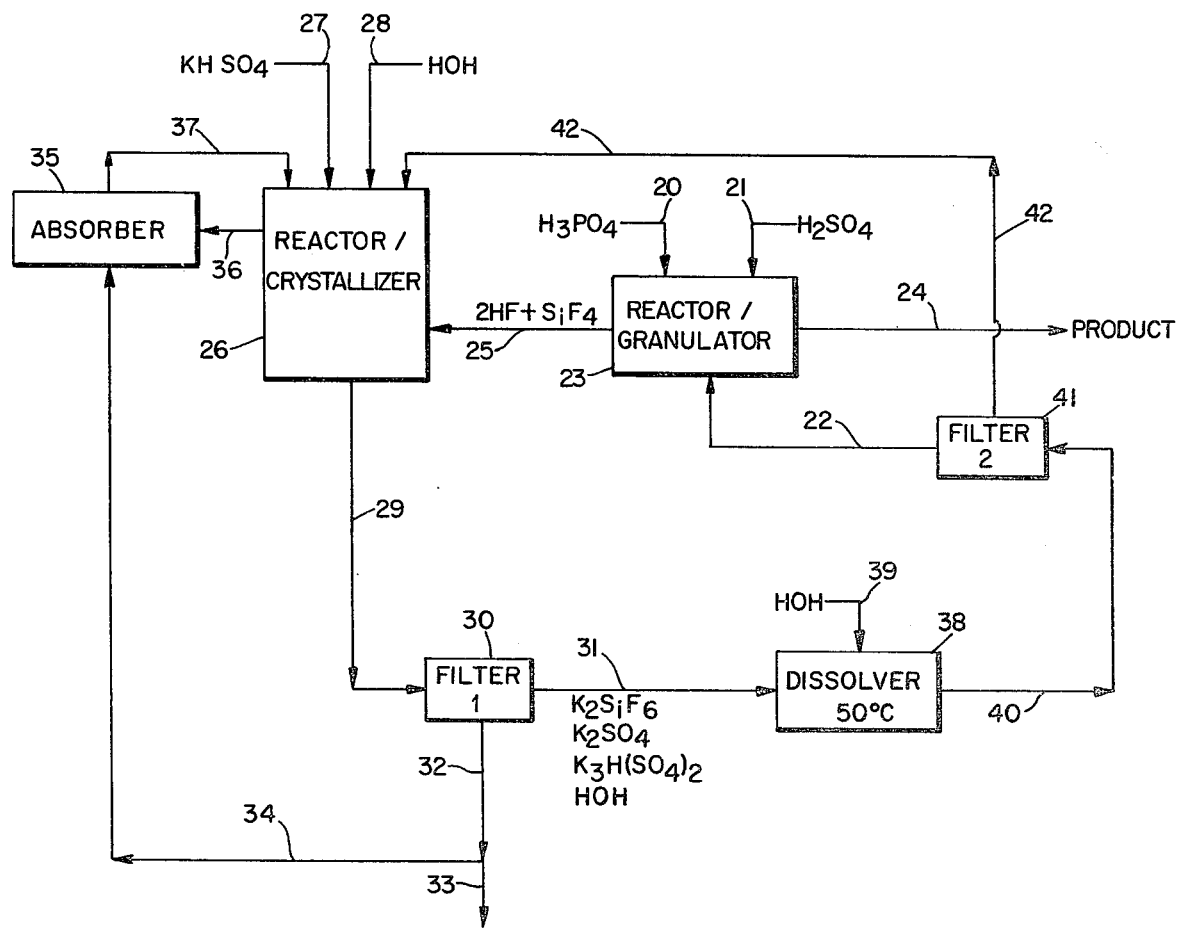
FIG. 5 is a flow sheet of a further embodiment of a continuous process according to the invention.

FIGS. 4 and 5 accompanying the application are flow sheets of continuous processes for conducting the process of the invention including reuse of the gaseous fluorides evolved. In the embodiment of FIG. 4 as illustrated, it it will be seen that there is set forth a schematic flow diagram which illustrates the use of potash or KCl to scrub out the silicon tetrafluoride and HF from the evolved gases. In the system of FIG. 4, the phosphoric acid and sulfuric acid are introduced by lines 1 and 2 and $K_2SiF_6$ by line 3 into a reactor/granulator 4 operated at a temperature in the range of 300°-500° C. The resulting polymerized product is removed by line 5 for recovery. The evolved gases, which generally comprise two moles of HF per mole of $SiF_4$, are removed through line 6 to reactor/crystallizer 7 where they are contacted with potassium chloride introduced through line 8. The KCl may be added as a solid or aqueous solution and recycled aqueous medium may be added from line 9. In reactor/crystallizer 7, the KCl and fluoride gases react to form additional $K_2SiF_6$ which is removed by line 10 in the process liquids to filter or other separator 11 where separation is made from the mother liquor. The mother liquor comprises an aqueous mixture of KCl, $K_2SiF_6$ and HCl. The recovered solid $K_2SiF_6$ may then be recycled to the main reactor/granulator by line 3.

The mother liquor solution is removed by line 12 as about a 20-30% HCl solution and distilled at 13 to remove HCl, usually as in HCl/water azeotrope from line 14 to provide a source of HCl. The bottoms from distillation 13 are recycled by line 15 to the reactor/crystallizer to provide aqueous media for the $KCl/K_2SiF_6$ reaction. Any gases leaving the crystallizer with the aqueous system are absorbed by the incoming stream at 16. It will be seen therefore that FIG. 4 illustrates a system wherein by-product gases are utilized and recycled to the system with the additional recovery of valuable HCl.

A further embodiment is illustrated in FIG. 5 which demonstrates the use of potassium bisulfate to scrub the silicon tetrafluoride and hydrogen fluoride from the flue gases of the reactor/granulator. As may be seen in FIG. 5, the basic reaction of phosphoric acid from line 20, sulfuric acid from line 21 and $K_2SiF_6$ from line 22 are reacted in reactor/granulator 23 as described for FIG. 4, with recovery of polymer product at 24. In this embodiment however, the HF and $SiF_4$ gas mixture evolved from the reactor/granulator at line 25 are passed to reactor/crystallizer 26 for reaction with $KHSO_4$ and water added at lines 27 and 28, respectively. In this system, the reaction mixture from the reactor/crystallizer is then passed by line 29 to a filter or other separator 30 to remove the solid $K_2SiF_6$, together with some $K_2SO_4$ and a double salt of $K_2SO_4$ and $KHSO_4$ by line 30 from the mother liquor. The mother liquor is removed from the separator 30 by line 32 and contains about 30-45% $H_2SO_4$ and a very small amount of $KHSO_4$ and $K_2SiF_6$ in solution. A portion of the mother liquor may be removed at 33 to provide a source of $H_2SO_4$ solution and the remainder is recycled to the reactor/crystallizer by line 34. The liquids pass through absorber 35 where they can absorb any gases leaving the reactor/crystallizer by line 36 for recycle by line 37.

The soluble compounds contained in the solids recovered from filter 30 are dissolved in dissolver 38 by water addition at 39, and the resulting mixture passed by line 40 to filter 41 where the $K_2SiF_6$ is separated. The $K_2SiF_6$ is then recycled to the reactor/granulator 23 by line 22 to serve as a source of $K_2SiF_6$. The mother liquor from filter 61, which comprises an aqueous solution of $KHSO_4$ and $K_2SO_4$, is recycled to the reactor/crystallizer by line 42. Thus, FIG. 5 provides a useful but alternate embodiment wherein by-products from the system are used advantageously.

The solid phase comprises the condensed polyphosphate polymers which contain some potassium sulfate and potassium metaphosphate along with both crystalline and amorphous polyphosphates in a solid product. The presence of these materials has been substantiated by X-ray diffraction analyses. Potassium metaphosphate and potassium sulfate are always present in the product as crystalline phases. It has been found that when pure grade materials are used, the amorphous polyphosphate formed is probably polyphosphoric acid. The mixture also contains $K_2P_2O_7$ and unconverted $K_2SiF_6$. When wet phosphoric acid is used the impurities present therein such as iron, aluminum and magnesium react with a portion of the polyphosphoric acid to form metallic polyphosphates. Therefore, since the use of wet process phosphoric acid is a preferred embodiment, these micronutrients are also present in the resulting product.

In further characterization of the products of the invention, reference is made to FIG. 1 which is a plot of the weight percent $K_2O$ or $P_2O_5$ versus the moles of sulfuric acid reacted per mole of potassium fluosilicate at different weight ratios of $P_2O_5$ over $K_2O$. The data in FIG. 1 is for pure systems and assumes 100% conversions. As may be seen from FIG. 1, as the molar ratio of sulfuric acid to $K_2SiF_6$ approaches 1, the weight percent $K_2O$ or $P_2O_5$ generally declines at the various ratios shown. Thus, a preferred embodiment of the invention is to always maintain the moles of sulfuric acid utilized so as to be less than an amount which would provide a molar ratio of sulfuric acid to $K_2SiF_6$ of 1 or less.

The polymeric products formed from potassium silicofluoride according to the present invention are high analysis fertilizers with P and K plant food nutrients approaching 100%. The polymers are substantially chlorine-free and have a low salt index, and as with polyphosphates in general, are not as readily solubilized or fixed in the soil. The polymers contain $K_2O$, $P_2O_5$ and $SO_4$, which are known to be vital plant nutrients. They do not exhibit phytotoxicity but can serve as complexing agents for such micronutrients in the soil as iron, magnesium, zinc, etc. Thus, the polymeric products of this invention are high analysis plant food fertilizers which minimize storage, transporation and handling per unit weight of nutrient.

The following examples are presented to illustrate the invention, but it is not to be considered as limited thereto. In the following examples, parts are by weight unless otherwise indicated.

EXAMPLES 1 to 12

In the following examples, two series of experiments were conducted. In the first series, the product quality at different $P_2O_5/K_2O$ and $H_2SO_4/K_2SiF_6$ ratios were determined under equilibrium conditions. That is, the reactants were heated at different temperatures for prolonged periods of time. The reaction procedure for each example was as follows: Solid potassium fluosilicate, 96% sulfuric acid, and wet process phosphoric acid having a concentration of 28 weight percent were mixed and heated at 150° C. to remove most of the free water. Thereafter, the mixture was heated at a temperature of about 250° C. for 18-24 hours after which time a sample was taken for analyses. Then the temperature was increased to 350° C., 450° C. and 650° C. (for some samples) and the mixtures heated at each temperature for an additional 18-24 hours. Samples were taken after each heating period for analyses.

Tables 1, 2 and 3 following contain the results of these reactions at 350° C. and 450° C. for $P_2O_5/K_2O$ weight ratios, and thus the N values of 1/1, 1.25/1 and 1.5/1.0, respectively, at different sulfuric acid levels. The total weight percent of $P_2O_5$ in the wet acid was 28.06 and the concentration of "free" phosphoric acid was 30.4 weight percent expressed as $H_3PO_4$. The "free" phosphoric acid is the total amount of phosphoric acid less that amount tied up by impurities such as iron, aluminum and magnesium. The following Tables contain the actual analyses at the given conditions and certain analyses calculated from the chemical equation as well as the appropriate correction factor to account for impurities in the wet process phosphoric acid in any undecomposed starting $K_2SiF_6$. The products resulting from these examples in the solid phases consist of $(KPO_3)$, $K_2SO_4$, amorphous material, a small amount of $K_2P_2O_7$ and unconverted starting material, with the amount of each of these depending upon the reaction conditions. The Tables showing these results are as follows:

TABLE 1

POTASSIUM POLYPHOSPHATES FROM $K_2SiF_6$
N-P-K
Wt. Ratio = 0-1-1        Mole Ratio = 0-0.66-1.0   n = 1.32

| Run No. (FSR) | 1 | | 2 | | 3 | | 4 | |
|---|---|---|---|---|---|---|---|---|
| $\frac{\text{Moles } H_2SO_4}{\text{Moles } K_2SiF_6}$ | 0.0896 | | 0.298 | | 0.508 | | 0.926 | |
| $\frac{\text{Wt. } H_2SO_4 + \text{Wt. } H_3PO_4^1}{\text{Wt. } K_2SiF_6}$ | 0.552 | | 0.649 | | 0.746 | | 0.940 | |
| $\frac{\text{Wt. } SO_3}{\text{Wt. } K_2O + \text{wt. } P_2O_5}$ | 0.035 | | 0.125 | | 0.212 | | 0.386 | |
| Results (Temp. °C) | 350 | 450 | 350 | 450 | 350 | 450 | 350 | 450 |
| Analysis (Wt. %) | | | | | | | | |
| F | 19.61 | 16.87 | 7.47 | 2.60 | 3.30 | 0.18 | 0.66 | 0.27 |
| $P_2O_5$ | 31.00 | | 37.1 | | 34.4 | | 33.4 | |
| $K_2O$ | 34.9 | | 36.2 | | 35.08 | | 31.5 | |
| $SO_3$ | | | 12.56 | | 18.93 | | | |
| $P_2O_5/K_2O$ | 0.89 | | 1.02 | | 0.98 | | 1.06 | |
| $\frac{SO_3}{K_2O + P_2O_5}$ | | | 0.17 | | 0.272 | | | |
| $K_2SO_4$ (Calc.) from $SO_3$) | | | 27.4 | | 41.2 | | | |
| $K_2SO_4$ (X-Ray) | 10 | | 35 | | 45 | | 20 | |
| Calculated Values (From Eq.) | | | | | | | | |
| $K_2SO_4$ | 6.7 | | 22 | | 36 | | 58 | |
| $K_2O$ | 35.5 | | 39.3 | | 39 | | 35 | |
| $P_2O_5$ | 35.5 | | 39.3 | | 39 | | 35 | |

[1] Free $H_3PO_4 = 98[(PO_4)_{Moles} + \Sigma(\text{anions})_{Moles} - \Sigma(\text{cations})_{Moles}]$

TABLE 2

POTASSIUM POLYPHOSPHATES FROM $K_2SiF_6$
N-P-K
Wt. Ratio = 0-1.25-1.0        Mole Ratio = 0-.88-1   n = 1.66

| Run No. (FSR) | 5 | | 6 | | 7 | | 8 | |
|---|---|---|---|---|---|---|---|---|
| $\frac{\text{Moles } H_2SO_4}{\text{Moles } K_2SiF_6}$ | 0.115 | | 0.512 | | 0.730 | | 0.938 | |
| $\frac{\text{Wt. } H_2SO_4 + \text{Wt. } H_3PO_4^1}{\text{Wt. } K_2SiF_6}$ | 0.632 | | 0.826 | | 0.920 | | 1.016 | |
| $\frac{\text{Wt. } SO_3}{\text{Wt. } K_2O + \text{Wt. } P_2O_5}$ | 0.036 | | 0.202 | | 0.283 | | 0.364 | |
| Results (Temp. °C) | 350 | 450 | 350 | 450 | 350 | 450 | 350 | 450 |
| Analysis (Wt. %) | | | | | | | | |
| F | 14.37 | 6.79 | 0.28 | 0.11 | 0.58 | 0.07 | 0.29 | 0.12 |
| $P_2O_5$ | | 46.19 | 39.0 | 41.04 | 40.9 | 40.36 | 37.41 | 36.32 |
| $K_2O$ | | 38.79 | 32.89 | 30.89 | 29.2 | 31.18 | 26.73 | 30.70 |
| $SO_3$ | | 3.77 | | 16.05 | | 19.40 | | |
| $P_2O_5/K_2O$ | | 1.19 | 1.18 | 1.33 | 1.40 | 1.30 | 1.40 | 1.18 |
| $\frac{SO_3}{K_2O + P_2O_5}$ | | 0.044 | | 0.223 | | 0.271 | | |
| $K_2SO_4$ (Calc. from $SO_3$) | | 8.2 | | 35.0 | | 42.3 | | |
| $K_2SO_4$ (X-Ray) | 10 | | 35 | 35 | 35 | 25 | 20 | 15 |
| Calculated Values (From Eq.) | | | | | | | | |
| $K_2SO_4$ | | 8.5 | 33 | 33 | 43 | 43 | 54 | 54 |
| $K_2O$ | | 38.1 | 36.6 | 36.6 | 34.0 | 34.0 | 32 | 32 |
| $P_2O_5$ | | 47.6 | 45.8 | 45.8 | 43.0 | 43.0 | 41 | 41 |

[1] Free $H_3PO_4 = 98[(PO_4)_{Moles} + \Sigma(\text{anions})_{Moles} - \Sigma(\text{cations})_{Moles}]$

TABLE 3

POTASSIUM POLYPHOSPHATES FROM $K_2SiF_6$
N-P-K
Wt. Ratio = 0-1.5-1.0        Mole Ratio = 0-1-1   n = 2

| Run No. (FSR) | 9 | | 10 | | 11 | | 12 | |
|---|---|---|---|---|---|---|---|---|
| $\frac{\text{Moles } H_2SO_4}{\text{Moles } K_2SiF_6}$ | 0.102 | | 0.324 | | 0.532 | | 0.740 | |
| $\frac{\text{Wt. } H_2SO_4 + \text{Wt. } H_3PO_4^1}{\text{Wt. } K_2SiF_6}$ | 0.711 | | 0.807 | | 0.903 | | 0.999 | |
| $\frac{\text{Wt. } SO_3}{\text{Wt. } K_2O + \text{Wt. } P_2O_5}$ | 0.037 | | 0.118 | | 0.193 | | 0.269 | |
| Results (Temp. °C) | 350 | 450 | 350 | 450 | 350 | 450 | 350 | 450 |
| Analysis (Wt. %) | | | | | | | | |
| F | 9.92 | 5.0 | 0.31 | 0.1 | 0.52 | 0.14 | 0.97 | 0.08 |
| $P_2O_5$ | 40.14 | | 47.2 | 45.7 | 40.69 | 41.3 | 40.7 | — |

TABLE 3-continued
POTASSIUM POLYPHOSPHATES FROM $K_2SiF_6$
N-P-K
Wt. Ratio=0-1.5-1.0     Mole Ratio=0-1-1   n=2

| Run No. (FSR) | 9 | 10 | 11 | 11 | 11 | 12 |
|---|---|---|---|---|---|---|
| $K_2O$ | 33.73 | 33.6 | 30.5 | 30.48 | 31.02 | 30.5 |
| $SO_3$ |  | 3.75 |  |  | 20.30 |  |
| $P_2O_5/K_2O$ | 1.19 | 1.40 | 1.50 | 1.33 | 1.33 | 1.33 |
| $\dfrac{SO_3}{K_2O = P_2O_5}$ |  |  |  |  | 0.28 |  |
| $K_2SO_4$ (Calc. from $SO_3$) |  |  |  |  | 44 |  |
| $K_2SO_4$ (X-Ray) | 15 | 25 | 25 | 30 | 20 | 30 |
| Calculated Values (From Eq.) |  |  |  |  |  |  |
| $K_2SO_4$ | 6 | 20 | 20 | 31 | 31 | 41 |
| $K_2O$ | 33.5 | 35.3 | 35.3 | 33.3 | 33.3 | 31.4 |
| $P_2O_5$ | 50.2 | 53.0 | 53.0 | 50.0 | 50.0 | 47 |

[1]Free $H_3PO_4 = 98[(PO_4)_{Moles} + \Sigma(anions)_{Moles} - \Sigma(cations)_{Moles}]$

EXAMPLES 13-15

In a second series of experiments, the degree of decomposition of the $K_2SiF_6$ was determined at different $P_2O_5/K_2O$ and $H_2SO_4/K_2SiF_6$ ratios for definite periods of reaction time at temperatures of 350 and 450° C. The procedure for conducting these experiments consisted of preparation of three identical mixtures from $K_2SiF_6$, sulfuric acid and wet process phosphoric acid which were heated to 150° C. to remove most of the water. All three resulting products were then placed in an oven at 350° C. Thereafter, a first sample was removed after two hours, a second sample after 4-5 hours, and a third sample after 8 hours. Each sample was then weighed and analyzed and the procedure repeated at 450° C.

Figure 2:
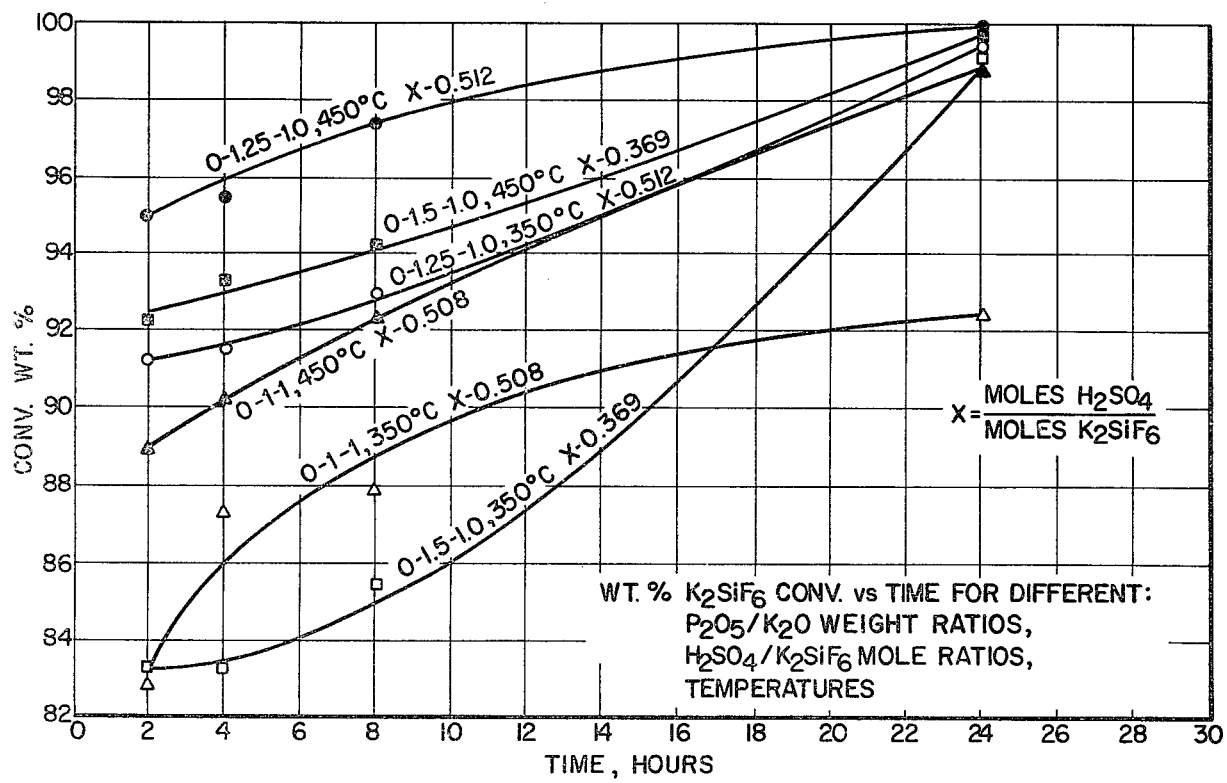
FIG. 2 is a graph of the degree of conversion of $K_2SiF_6$ versus the time under different conditions.

The results from these experiments are contained in FIG. 2 accompanying the present invention. It will be seen that FIG. 2 is a plot of the weight percent conversion versus the time in hours at the different conditions. Also shown on this plot are the results obtained after 24 hours. As may be noted, the conversion gradually increased from about 2 hours up to a maximum conversion at 24 hours where in most cases substantially 100 percent conversion had been obtained.

Figure 3:
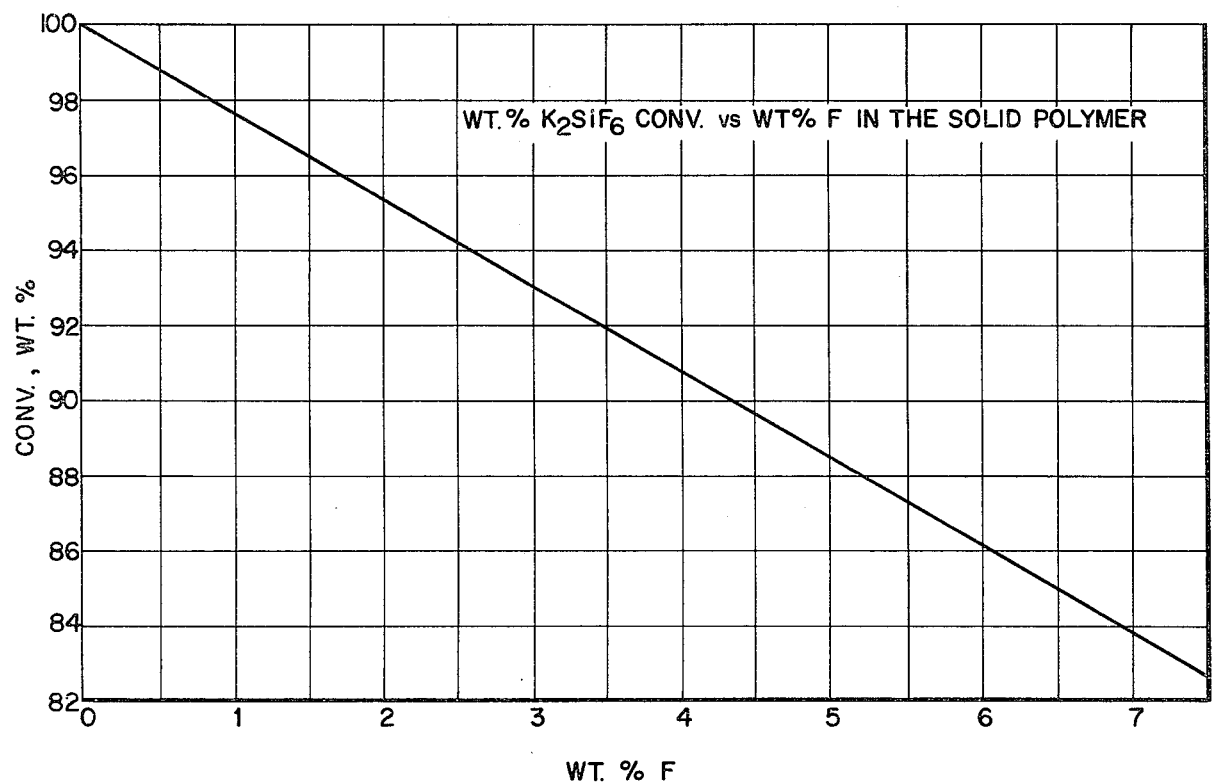
FIG. 3 is a graph of the fluoride concentration in the product versus the degree of conversion under different conditions.

The same experiments were used in order to provide the data for FIG. 3 accompanying the application which is a plot of the conversion in weight percent versus the weight percent fluoride in the product or the solid polymer. It will be noted that as the conversion approaches 100 percent, the weight percent of fluoride in the solid polymer approaches 0. Therefore, in order to reduce the fluoride content of the polymer and obtain and remove the fluorine by gaseous evolution, essentially complete conversion is desirable.

The application has been described herein with reference to certain preferred embodiments. However, as obvious variations thereon will become apparent to those skilled in the art the invention is not to be considered as limited thereto.

What is claimed is:

1. A method for the production of a solid potassium polyphosphate polymer containing crystalline $KPO_3$, crystalline $K_2SO_4$, amorphous polyphosphates, $K_2P_2O_7$, and unconverted $K_2SiF_6$, which comprises reacting potassium fluosilicate which has been separated from other inorganic materials with a mixture of phosphoric acid and sulfuric acid at a temperature of 250°-500° C., wherein the amount of phosphoric acid reacted corresponds to a molar ratio of $P_2O_5:K_2O$ in the range of 4:1 to 1:1, and wherein 0.05-0.95 moles of sulfuric acid are reacted per mole of potassium fluosilicate, the reaction being conducted for a sufficient period of time to evolve fluorides from the reacting mixture and to produce said solid potassium polyphosphate polymer.

2. A method according to claim 1 wherein the phosphoric acid has a $P_2O_5$ concentration of about 25-38% and the sulfuric acid has a concentration of about 96%.

3. A method according to claim 2 wherein the reaction is conducted for a sufficient period to evolve fluorides in the form of silicon tetrafluoride and hydrogen fluoride.

4. A method according to claim 1 wherein the reaction is conducted for a period of about ½ to 24 hours with evolution of gases and recovery of solid product.

5. A method according to claim 3 wherein the silicon tetrafluoride and hydrogen fluoride evolved during the reaction are trapped by reaction with an aqueous solution of calcium hydroxide to form calcium fluoride.

6. A method according to claim 3 wherein the silicon tetrafluoride and hydrogen fluoride evolved during the reaction are trapped in an aqueous solution of a soluble potassium salt which forms $K_2SiF_6$.

7. A method according to claim 6 wherein the $K_2SiF_6$ formed is recycled and reacted with phosphoric acid and sulfuric acid.

8. A solid potassium polyphosphate polymer produced by the reaction of claim 1.

9. A fertilizer containing as the effective ingredient, the polymer of claim 8.

10. A method according to claim 1 wherein the fluoride gases evolved from the reaction comprise a mixture of silicon tetrafluoride and hydrogen and hydrogen fluoride, and are reacted with a potassium salt to produce a mixture of $K_2SiF_6$, KCl and HCl in aqueous solution, the $K_2SiF_6$ is removed and recycled for further reaction with phosphoric acid and $H_2SO_4$, the resulting mother liquor is distilled to remove HCl from the system and the aqueous HCl liquids are recycled for further reaction with the evolved fluoride gases and potassium salt.

11. A method according to claim 1 wherein the evolved gases comprising HF and $SiF_4$ are reacted in an aqueous medium with $KHSO_4$ to produce a mixture of $K_2SiF_6$, $K_2O_4$, a double salt of $KHSO_4$ and $K_2SO_4$, and water, the solids are separated from solution, and the solution is recycled to the reaction of $KHSO_4$ and fluoride gases, the $K_2SiF_6$ is recovered and recycled for reaction with the phosphoric acid and sulfuric acid.

* * * * *